US005244990A

United States Patent [19]
Mitchell

[11] Patent Number: 5,244,990
[45] Date of Patent: Sep. 14, 1993

[54] PREPOLYMERIZED CATALYST AND USE THEREOF

[75] Inventor: Kent E. Mitchell, Bartlesville, Okla.

[73] Assignee: Phillips Petroleum Company, Bartlesville, Okla.

[21] Appl. No.: 817,708

[22] Filed: Jan. 7, 1992

[51] Int. Cl.$^5$ ............................................. C08F 4/651
[52] U.S. Cl. ..................................... 526/125; 526/119; 526/159; 526/352; 502/108; 502/103
[58] Field of Search ......................... 526/119, 125, 159

[56] References Cited
U.S. PATENT DOCUMENTS 4,325,837  4/1982  Capshew et al. ............... 526/125 X
4,326,988  4/1982  Welch et al. ................... 526/125 X
4,394,291  7/1983  Hawley ........................... 526/125 X Primary Examiner—Patrick P. Garvin
Attorney, Agent, or Firm—Edward L. Bowman

[57] ABSTRACT

A prepolymerized olefin polymerization catalyst, its preparation, and use are disclosed. The catalyst is prepared by contacting a solid particulate transition metal-containing olefin polymerization catalyst with an olefin in a confined zone under suitable conditions wherein the prepolymerization is conducted under conditions such that the olefin is added to the confined zone at a rate such that the pressure in the confined zone increases no more than about 0.5 psig/sec. during the olefin addition.

17 Claims, No Drawings

PREPOLYMERIZED CATALYST AND USE THEREOF

BACKGROUND OF THE INVENTION

This invention relates to catalyst, a method for producing catalyst, and a process for using the catalyst in the polymerization of olefins. The invention is particularly directed to the preparation of olefin polymerization catalysts which contain a prepolymer.

A number of the later generation high activity polymerization catalysts are prepared by processes which result in solid particulate catalysts having varying degrees of catalyst fines. The use of fine particulate polymerization catalyst in many cases leads to the production of polymer having undesirable levels of fine particulate polymer. One of the techniques that has been used in the past to reduce the production of polymer fines has been to treat the particulate polymerization catalyst with a prepolymer. Two examples of such processes are disclosed in U.S. Pat. Nos. 4,325,837 and 4,326,998, the disclosures of which are incorporated herein by reference.

While the addition of prepolymer has often been found to be effective in the reduction of polymer fines, there is still a need for greater improvement.

An object of the present invention is to provide a method for carrying out prepolymerization of a catalyst in such a fashion as to provide further improvements in the reduction of polymer fines.

Another object of the present invention is to provide a novel catalyst resulting from this new prepolymerization technique.

Still another object of the present invention is to provide a process for preparing polymers using the new prepolymerized catalyst.

Other aspects, objects, and advantages of the present invention will become apparent to those skilled in the art having the benefit of this disclosure.

SUMMARY OF THE INVENTION

In accordance with the present invention a prepolymerized catalyst is provided which is prepared by contacting a solid particulate transition metal-containing olefin polymerization catalyst with an olefin in a confined zone under conditions sufficient to cause the formation of catalyst particles containing polymer of said olefin. The prepolymerization is conducted under conditions such that the olefin is added to the confined zone at a rate such that the pressure in the confined zone increases no more than about 0.5 psig/sec. during the time the olefin is added during the prepolymerization.

Further, in accordance with the present invention there is provided a process for polymerizing olefins comprising contacting the olefin in the presence of a catalyst resulting from the aforementioned new prepolymerization process.

DETAILED DESCRIPTION OF THE INVENTION

It is contemplated that the present invention should be applicable to generally any of the solid particulate transition metal-containing olefin polymerization catalysts, particularly those catalysts which have significant amounts of particles which are finer than generally desired. The invention is particularly applicable to those fine olefin polymerization catalysts which contain a transition metal selected from titanium, zirconium, and vanadium. One particularly desirable type of catalyst which can be prepolymerized using the inventive process is the type of catalyst disclosed in the U.S. Pat. Nos. 4,325,837, 4,326,988 and 4,394,291; the disclosures of which are incorporated herin by reference.

One preferred type of catalyst is prepared by reacting a metal halide compound and a transition metal compound wherein the metal halide compound is selected from metal dihalides and metal hydroxyhalides where the metal is selected from Group IIA and IIB of the Periodic Table and the transition metal of the transition metal compound is selected from Group VB and IVB metals of the Periodic Table. The transition metal compound is one in which the transition metal is bonded to at least one atom selected from oxygen, nitrogen, or sulfur, and the oxygen, nitrogen or sulfur atoms are in turn bonded to a carbon atom of a carbon-containing radical. This resulting first component is then reacted with a precipitating agent to obtain a particulate olefin polymerization catalyst. A wide range of precipitating agents can be employed in this second step. In an especially preferred embodiment after this fine particulate catalyst has been subjected to prepolymerization, it is contacted with an activating amount of titanium tetrachloride.

Typically, the precipitating agent which is reacted with the first catalyst component is generally selected from the group consisting of organometallic compounds in which the metal is selected from metals of Groups I-III of the Periodic Table, metal halides and oxygen-containing halides of elements selected from Groups IIIA, IVA, IVB, VA and VB of the Periodic Table, hydrogen halides, and organic acid halides having the formula

wherein R is an alkyl, aryl, cycloalkyl group or combinations thereof containing 1 to about 12 carbon atoms and X is a halogen atom.

The currently preferred reactant for use with the first catalyst component is an organoaluminum halide compound which includes for example dihydrocarbylaluminum monohalide, monohydrocarbylaluminum dihalides, and hydrocarbylaluminum sesquihalides, wherein each hydrocarbyl group is individually selected from linear and branch chain hydrocarbyl radicals containing from 1 to about 20 carbon atoms per radical which hydrocarbyl radicals can be the same or different. Some typical examples of such organoaluminum halide compounds include methylaluminum dibromide, ethylaluminum dichloride, ethylaluminum diiodide, isobutylaluminum dichloride, dodecylaluminum dibromide, dimethylaluminum bromide, diethylaluminum chloride, diisopropylaluminum chloride, methyl-N-propylaluminum bromide, diphenylaluminum chloride, dicyclohexylaluminum bromide, methylaluminum sesquibromide, ethylaluminum sesquichloride, and the like.

The conditions employed in forming prepolymer on such a particulate olefin polymerization catalyst can vary widely depending upon the particular results desired. Typically, the olefin used to form the prepolymer is selected from aliphatic mono-1-olefins having from 2 to about 18 carbon atoms per molecule. The prepolymerization is carried out by contacting the fine particulate catalyst with the olefin in a confined zone under suitable conditions. While it is not always necessary that a co-catalyst be employed, generally a co-catalyst is employed to obtain the most desired results. The particular co-catalyst used during the prepolymerization can be selected from generally any compound which is capable of acting as a co-catalyst with the fine particulate catalyst. As a general rule a wide range of organometallic reducing agents have been found to be suitable as co-catalysts. Particularly preferred co-catalysts include trihydrocarbylaluminum compounds and hydrocarbylaluminum halides of the type previously described. The amount of co-catalyst required can be readily determined by routine experimentation after having had the benefit of the present disclosure.

In accordance with the present invention, the prepolymerization is carried out in a confined zone and the olefin to be prepolymerized is added to the confined zone at a rate such that the pressure in the confined zone increases no more than about 0.5 psig/sec. during the time that the olefin is added during the prepolymerization. More preferably the olefin is added to the confined zone at a rate such that the pressure in the confined zone increases no more than about 0.33 or still more preferably no more than about 0.25 psig/sec. Generally, the olefin is added under conditions such that prepolymerization occurs as the olefin is added.

The ultimate pressure at which the prepolymerization is conducted can vary over a wide range; however, as a general rule it has been observed that better results are obtained if the pressure in the confined zone is kept below 20 psig. The temperature likewise can vary over a wide range. As a general rule better results in terms of reduced fines are obtained using lower temperatures; however, this obviously must be balanced against the polymerization rate.

The amount of prepolymer added to the catalyst can vary over a wide range, typically it would be in the range of from about 1 to about 80 weight percent of the total prepolymerized catalyst, more preferably from about 3% to about 50% and in many cases more desirably from about 5% to about 20% by weight of the total prepolymerized catalyst.

When it is desired to treat the resulting prepolymerized catalyst with a halide of a transition metal compound, such can be done generally in the manner taught in U.S. Pat. No. 4,325,837. Typically this involves contacting the prepolymerized catalyst with the transition metal halide in the presence of a suitable diluent. The treating temperature can be selected over a fairly broad range and is normally in the range of about 0° C. to about 200° C. The temperatures, however, are preferably kept below that which would result in the dissolution of the prepolymer. Thus, typically, the treatment would be carried out at a temperature of less than about 100° C., more preferably about 15° C. to about 90° C., and more preferably from about 15° C. to about 50° C. It is often quite convenient to carry out this treatment step at a temperature in the range of about 20° C. to about 30° C.

A variety of polymerizable compounds are suitable for use with the prepolymerized catalysts of the present invention. Olefins which can be homopolymerized or copolymerized with the invention catalysts include aliphatic mono-1-olefins. While the invention would appear to be suitable for use with any aliphatic mono-1-olefin, those olefins having 2 to 18 carbon atoms are most often used. The mono-1-olefins can be polymerized according to the present invention employing either a particle form process, a solution form process, or a gas phase process. Aliphatic mono-1-olefins can be copolymerized with other 1-olefins and/or with other smaller amounts of other ethylenically unsaturated monomers, such as 1,3-butadiene, isoprene, 1,3-pentadiene, styrene, alpha-methylstyrene, and similar ethylenically unsaturated monomers which do not impair the catalyst. Typically, the inventive catalyst is used with a suitable catalyst, including the type of cocatalysts described above for use in the prepolymerization step.

Polymerization using the present invention catalysts with cocatalysts, as above described, can be performed either batchwise or continuously. In a batch process, for example, a stirred autoclave is prepared by first purging with nitrogen and then with a suitable compound, such as isobutane for example. When the catalyst and cocatalyst are employed either can be charged to the reactor first or they can be charged simultaneously through an entry port under an isobutane purge. After closing the entry port, hydrogen, if used, is added, and then a diluent such as isobutane is added to the reactor. The reactor is heated to the desired reaction temperature, which for polymerizing ethylene, for example, is, for best results, generally within a range of about 50° C. to about 120° C. and the ethylene is then admitted and maintained at a partial pressure within a range of about 0.5 MPa to about 5.0 MPa (70-725 psig) for best results. At the end of the designated reaction period, the polymerization reaction is terminated and the unreacted olefin and isobutane are vented. The reactor is opened and the polymer, such as polyethylene, is collected as a free-flowing white solid and is dried to obtain the product.

In a continuous process, for example, a suitable reactor such as a loop reactor is continuously charged with suitable quantities of solvent or diluent, catalyst, cocatalyst, polymerizable compounds and hydrogen if any and in any desirable order. The reactor product is continuously withdrawn and the polymer recovered as appropriate, generally by flashing the diluent (solvent) and unreacted monomers and drying the resulting polymer.

The olefin polymers made with the catalysts of this invention are useful in preparing articles by conventional polyolefin processing techniques such as injection molding, rotational molding, extrusion of film, and the like. For example, polyethylene made with the catalysts of this invention is typically of narrow molecular weight distribution which is especially desirable for injection molding applications. Furthermore, the polyethylene produced as described generally has a desirable high bulk density of about 0.44 g/cc as recovered from the polymerization zone. In addition, the polyethylene produced as described is characterized by a high degree of stiffness, e.g. high flexural modulus, which is also desirable in many applications. Also, the polyethylene particles produced are characterized by low fines content.

A further understanding of the present invention and its objects and advantages will be provided by the following examples.

EXAMPLE I

This example illustrates the preparation of a control olefin polymerization catalyst having no prepolymer.

The preparation was carried out in a ten gallon reactor equipped with a mixer. The reactor had been purged with nitrogen. About seven gallons of hexane was added to the reactor, and the mixer was started. About 98 grams of water was then added through the nitrogen dispersion line. The reactor contents were then allowed to mix for about 20 minutes.

About 414 g magnesium chloride was then added to the reactor while the mixing was continued. After 15 minutes of mixing, 1.6 grams of titaniumbutoxide was added through a ¼" tube, so that it took about 1 hour to complete the charge. The reactor was then closed and heated to about 100° C. and held at that temperature for about 1 hour. Then the resulting mixture was cooled to about 20° C. and the mixing was continued overnight while the reaction mixture was retained at about 20° C.

Then with the reaction mixture at about 20° C., a nitrogen sparge was initiated and about 3.2 lbs. of ethyl-aluminum dichloride (hereinafter referred to as EADC) was added to the mixture at a rate of about 0.07 lbs./minute. After mixing at 30° C. for 10 minutes after the completion of the EADC addition, the nitrogen sparge was terminated and the reaction mixture was allowed to settle. The liquid was then decanted and the precipitate was washed three times with hexane. The precipitate was then treated with about 7.5 lbs. of titanium tetrachloride. The titanium tetrachloride treatment involved mixing the precipitate with titanium tetrachloride for 1 hour. The resulting solid product was then washed 4 times with hexane. The catalyst thus prepared was stored in a nitrogen purged carboy for later use.

EXAMPLE II

This example illustrates the preparation of an inventive olefin polymerization catalyst by forming a prepolymerized coating on the catalyst by slow ethylene addition.

Here again, the preparation was carried out in a ten gallon reactor equipped with a mixer. The reactor had been purged with nitrogen. About seven gallons of hexane was added to the reactor, and the mixer was started. About 98 grams of water was then added to the reactor through the nitrogen dispersion line. The reactor content was then allowed to mix for about 15 minutes.

About 420 grams of magnesium chloride was added to the reactor while mixing. About 10 minutes thereafter, about 1.9 lbs. of titanium tetrabutoxide was added through a ¼" tube, so that it took about 1 hour to complete the charge of the titanium tetrabutoxide. The reactor was closed and heated to 100° C. and held at that temperature for about 1 hour. Upon cooling to 20° C., the reaction mixture was further mixed at 20° C. overnight under nitrogen.

Then a nitrogen sparge was initiated and about 3.2 lbs. of EADC was added to the mixture at a rate of about 0.08 lbs./minute. After mixing at 30° C. for about 10 minutes after the completion of the addition of EADC, the nitrogen sparge was terminated and the reaction mixture was allowed to settle, followed by decantation to remove the liquid phase. The precipitate was then washed three times with hexane.

A mixture of the precipitate in a diluent was cooled to 18° C., followed by the addition of 1.5 lbs. of EADC and about 1 lb of ethylene. The ethylene was metered into the reactor over a time period in the range of about 1 to 2 minutes. The maximum reactor pressure was about 20 psig. After reaction for no greater than about two hours and eleven minutes, the liquid phase was decanted and the prepolymerized solid was washed twice with hexane. The hexane washed solid was then treated with 7.3 lbs. of titaniumtetrachloride and thoroughly mixed for one hour. The liquid phase was decanted and the precipitate was washed 5 times with hexane.

EXAMPLE III

This example illustrates the preparation of a comparison olefin polymerization catalyst by forming a prepolymer coated catalyst obtained by fast addition of the ethylene rather than slow the addition used in Example II.

Here again, the preparation was carried out in a ten gallon reactor equipped with a mixer. The reactor had been sparged with nitrogen. About seven gallons of hexane was added to the reactor, followed by agitation. About 98 grams of water was then added to the reactor through the nitrogen dispersion line.

The reactor contents were allowed to mix for about 15 minutes. About 416 grams of magnesium chloride was added to the reactor while mixing was continued. About 10 minutes thereafter, about 1.6 lbs. of titanium tetrabutoxide was added through a ¼" tube, so that it took about 1 hour to complete the charge. The reactor was closed and heated to 100° C. and mixing was continued while the temperature was maintained at 100° C. for about 1 hour. Upon cooling to 20° C., the reaction mixture was further mixed at 20° C. overnight under nitrogen.

Then a nitrogen sparge was initiated and about 3.2 lbs. of EADC was added to the mixture at a rate of about 0.07 lbs./minute. The resulting mixture was mixed for 10 minutes after the addition of EADC. The nitrogen sparge was terminated and the reaction mixture was allowed to settle. The liquid was decanted off and the precipitate was washed 3 times with hexane. A mixture of the precipitate and a liquid diluent was cooled to 18° C. and 1.5 lbs. of EADC was added. About 1 lb. of ethylene was metered into the reactor over a time period of about 5 seconds. The maximum reactor pressure was about 20 psig. After reaction for about 2 hours, the liquid phase was decanted and the prepolymerized solid was washed twice with hexane. The hexane-washed solid was then treated with about 7.3 lbs. of titanium tetrachloride and thoroughly mixed for 1 hour. The liquid phase was decanted and the particulate solid was washed 5 times with hexane. The resulting prepolymerized catalyst was dumped to a 5 gallon carboy for later use.

EXAMPLE IV

This example sets forth the results of the polymerizations of ethylene using the catalyst prepared in Examples I-III.

The polymerizations were carried out at about 100° C. in a 3.8 liter autoclave-type reactor. The reactor was prepared for polymerization in each case by adding 1 liter of isobutane and heating to 110° C. for 1 hour. The reactor was then cooled to room temperature and flushed with nitrogen-free isobutene. After the reactor had cooled, 0.5 milliliters of 15 weight percent TEA in heptane was charged, followed by the addition of the catalyst slurry. The reactor was sealed and 132 psig of hydrogen was added, as measured by pressure drop from a supply vessel. Next, 2 liters of isobutane were added at room temperature using a nitrogen purge and being careful not to get nitrogen into the reactor. The reactor was heated to the polymerization temperature. Ethylene was constantly added to keep the total pressure of the reactor at about 500 psig. After about 1 hour, the polymerization was terminated by stopping the flow of ethylene and the reactor was vented. The polymer was collected, dried overnight, and weighed. The percent of polymer fines were determined by placing about 100 grams of the polymer on a set of mechanically agitated sieves. The sieve set consisted of seives having U.S. Sieve Series of 30, 50, 80, 100, 200, and the bottom pan. The percent polymer fines referred to herein was the weight percent of the polymer that passed through the 100 size seive. The results obtained are summarized in Table I.

| Run No. | Catalyst | Polymer Fines (wt %) |
|---|---|---|
| 1 | No prepolymer (Ex. I) | 26.0 |
| 2 | Slow addition (Ex. II) | 6.9 |
| 3 | Fast addition (Ex. III) | 23.9 |

Table I shows that the catalyst of Example I, which had no prepolymer, gave a polyethylene polymer having a fairly high weight percent of polymer fines, namely about 26%. Run No. 2 shows that the prepolymerized catalyst prepared according to the present invention gave a polyethylene polymer having only about 6.9 weight percent fines. Run No. 3 shows that the prepolymerized catalyst of Example III, i.e., a catalyst prepolymrized by adding the ethylene more quickly, gave polyethylene having only slightly lower polymer fines than did the non-prepolymerized catalyst of Example I. This data illustrates the applicant's observations that slower addition of the ethylene during the prepolymerization step results in a prepolymerized catalyst capable of producing even lower polymer fines than those prepolymerized catalysts in which the ethylene was added more quickly.

That which is claimed is:

1. A process for polymerizing an olefin comprising contacting said olefin under suitable polymerization conditions with a catalyst and an organometallic cocatalyst, said catalyst being a prepolymerized catalyst prepared by contacting a solid particulate transition metal-containing olefin polymerization catalyst with an olefin in a confined zone under conditions sufficient to cause the formation of catalyst particles containing polymer of said olefin, wherein the prepolymerization is conducted under conditions such that the olefin is added to the confined zone at a rate such that the pressure in the confined zone increases no more than about 0.5 psig/sec. during the time the olefin in added during the prepolymerization.

2. A process according to claim 1 wherein the solid particulate transition metal-containing olefin polymerization catalyst is prepared by reacting magnesium dichloride and a transition metal tetraalkoxide wherein the transition metal is selected from titanium, zirconium, and vanadium to produce a first component which is reacted with a halogenating agent to yield said catalyst.

3. A process according to claim 2 wherein magnesium dichloride is reacted with a titanium tetraalkoxide to produce a first component and said first component is reacted with an alkyl aluminum halide to yield said catalyst.

4. A process according to claim 3 wherein said titanium tetraalkoxide is selected from those in which the alkyl groups of the alkoxide have 2 to 4 carbons.

5. A process according to claim 3 wherein titanium tetraethoxide is reacted with magnesium dichloride to produce said first component.

6. A process according to claim 5 wherein said first component is reacted with ethyl aluminum dichloride to yield said catalyst.

7. A process according to claim 6 wherein the resulting prepolymerized catalyst is further contacted with TiCl$_4$.

8. A process according to claim 7 wherein said olefin is ethylene and said prepolymerization is conducted in the presence of ethyl aluminum dichloride.

9. A process according to claim 8 wherein said prepolymerized catalyst contains about 1 to about 80 weight percent prepolymer.

10. A process according to claim 8 wherein the olefin is added in an amount such that the pressure in the confined zone does not exceed about 20 psig and said olefin comprise ethylene.

11. A process according to claim 10 wherein the olefin is added at a substantially constant rate over at least about one minute.

12. A process according to claim 10 wherein the olefin is added at a substantially constant rate and the pressure in the confined zone increases no more than about 0.3 psig/sec. during the time that the olefin is added.

13. A process according to claim 8 wherein the olefin is added at a substantially constant rate for at least about the first minute.

14. A process according to claim 8 wherein portions of the olefin are added at different times.

15. A process according to claim 14 wherein each addition of olefin is completed in about 3 minutes.

16. A process according to claim 15 wherein the pressure in the confined zone does not exceed about 20 psig.

17. A process for polymerizing an olefin comprising contacting said olefin under suitable polymerization conditions with a catalyst and an organometallic cocatalyst, wherein said catalyst is prepared by combining magnesium dichloride and a titanium alkoxide, in which the alkyl groups of the alkoxide have 2 to 4 carbon atoms, in a hydrocarbon to obtain a solution; said solution is then reacted with an alkylaluminum halide to yield a particulate solid precipitate; the precipitate is combined with a liquid diluent and cooled to a temperature no greater than about 18° C.; then an alkylaluminum halide prepolymerization cocatalyst is added; and then ethylene is metered into the mixture in a confined reactor at a rate such that the pressure in the confined reactor increases no more than about 0.5 psig/sec., the maximum reactor pressure during the addition of the ethylene being about 20 psig; and contacting the resulting prepolymerized solid with titanium tetrachloride.

* * * * *